United States Patent [19]
Sullivan, et al.

[11] Patent Number: 5,366,365
[45] Date of Patent: Nov. 22, 1994

[54] MEANS FOR CONTROLLING FEEDSTOCK COMPACTION IN FORMING FLEXIBLE POROUS PIPES OF CONTROLLED PORE SIZE

[76] Inventors: Henry W. Sullivan,, 10814 Jaycee La., Houston, Tex. 77024; Charles R. Killian, 14525 O'Day Rd., Pearland, Tex. 77581; Paul D. Bettencourt, 13910 Kingsride, Houston, Tex. 77079

[21] Appl. No.: 893,386
[22] Filed: Jun. 4, 1992
[51] Int. Cl.$^5$ ............................................. B29C 67/22
[52] U.S. Cl. .................... 425/144; 425/4 C; 425/147; 425/148; 264/40.7
[58] Field of Search ............... 425/143, 147, 149, 4 C, 425/144, 145, 148; 264/40.7

[56] References Cited

U.S. PATENT DOCUMENTS

| | | | |
|---|---|---|---|
| 2,568,332 | 9/1951 | Genovese | 425/147 |
| 4,003,408 | 1/1977 | Turner | 264/DIG. 69 |
| 4,110,420 | 8/1978 | Turner | 264/41 |
| 4,197,070 | 4/1980 | Koschmann | 425/143 |
| 4,517,316 | 5/1985 | Mason | 264/41 |
| 4,615,642 | 10/1986 | Mason | 264/41 |
| 4,616,055 | 10/1986 | Mason | 264/45.9 |
| 4,784,595 | 11/1988 | Halter | 425/147 |
| 4,931,236 | 6/1990 | Hettinga | 425/326.1 |
| 4,958,770 | 9/1990 | Mitchell | 425/379.1 |
| 4,970,043 | 11/1990 | Doan et al. | 264/37 |

FOREIGN PATENT DOCUMENTS

| | | | |
|---|---|---|---|
| 2634280 | 2/1978 | Germany | 425/147 |
| 61-293812 | 12/1986 | Japan | 425/147 |
| 62-286110 | 12/1987 | Japan | 425/149 |

*Primary Examiner*—Allan R. Kuhns

[57] ABSTRACT

A process for making porous flexible pipes from two feed streams containing a thermoplastic material and a thermoset material, in which the feed streams are delivered to a die head extruder in a substantially compaction-free and segregation-free manner to insure that the feed composition in the extruder is substantially the same as the initial feed composition. The process can be automated so that an operator can manufacture porous flexible pipes of desired porosity and other rheological and mechanical characteristics by simply entering a command which will simultaneously adjust the process parameters such as the temperature and/or pressure inside the extruder, and the post-extrusion tension to meet the special need.

6 Claims, 1 Drawing Sheet

MEANS FOR CONTROLLING FEEDSTOCK COMPACTION IN FORMING FLEXIBLE POROUS PIPES OF CONTROLLED PORE SIZE

FIELD OF THE INVENTION

This invention relates to porous flexible pipes of controlled porosity; more particularly, this invention relates to porous flexible pipes produced by an extrusion molding process from raw materials comprising thermoset particles and thermoplastic particles, under a compaction free and segregation free process to insure a uniform quality and theological characteristics of the final product.

BACKGROUND OF THE INVENTION

Porous pipe has been used in underground irrigation systems. Underground irrigation using porous pipes have numerous advantages over above-ground watering. In above-ground watering, the water must enter the soil and penetrate through the root zone to benefit plants. With above-ground watering, water can be lost through evaporation and runoff. With underground irrigation systems, water is pumped through porous pipes and is delivered directly to the subsurface roots of the crop being cultivated. Optionally, nourishing fertilizer can be added to the feed water with minimum loss due to runoff. Additionally, air, herbicides, and/or insecticides can be directly distributed to the subsurface root zone on the soil using underground irrigation. Because the nutrients or other chemicals are directly distributed to the roots, instead of the soil surface, less chemicals are wasted and chemical requirements are minimized. This not only lowers costs significantly, but also is important to minimize potential damage to the environment. Porous flexible pipes of controlled and different porosity have also been used to diffuse fine bubbles of air and/or other gases into water and/or other liquids for use in effluent treating, bioremediation and fish farming.

Porous pipes used for underground irrigation processes usually are made from an extrusion process employing ground rubber crumbs and polyethylene particles as raw materials. U.S. Pat. Nos. 4,003,408; 4,110,420; and 4,168,799 issued to Turner disclosed porous irrigation pipes produced from reclaimed rubber mixed with polyethylene as a binder. The materials disclosed therein are incorporated herein by reference. The prescribed mixture is extruded by a wave screw. The extruder is equipped with a heating system to melt the thermoplastic polyethylene binder. During the heating and extruding process in the extruder, water vapor and any other gaseous components contained in the feed material expand to create porosity in the extrudate. The extruded pipe is cooled in a water bath to preserve its final form as a porous pipe. A venting capability is provided in the extruder to provide various degrees of vacuum and control the porosity of the end product porous pipe.

The porous pipes made according to the Turner process often suffer inconsistent quality problems, especially the variations in the porosity of the final product. U.S. Pat. Nos. 4,517,316; 4,615,642; and 4,616,055 issued to Mason disclosed methods which were attempts to improve the uniformity of porosity of the porous irrigation pipes. The contents of these disclosures are incorporated herein by reference. In these processes, the raw materials, which comprise reclaimed rubber tire treads and polyethylene particles, are first preprocessed into cylindrically shaped pellets form to provide a preformed feed material of desired composition and moisture content. Such a preprocessing step to form pellets might reduce the variability in the feed composition and reduce the surface area on which the moisture may be retained. Mason's patents also utilize additional constituents such as slip agents and lubricants to improve mixing inside the extruder. Another attempt to improve the uniformity of porosity of the flexible pipe of the porous pipes is disclosed in U.S. Pat. No. 4,958,770 issued to Mitchell. The content of the '770 patent is incorporated herein by reference. In the '770 patent, the crumb rubber and the polyethylene resin binder are thoroughly dried prior to their introduction to the extruder. The crumb rubber is fed into the extruder via a crammer screw, which delivers the dried crumb rubber into the extruder. Polyethylene resin is introduced into the crumb rubber via a polyethylene extruder before the crammer screw. The crammer screw actually delivers the crumb rubber with the accompanying polyethylene particles into the extruder. Since the feed materials have already been thoroughly dried, no venting is required in the extruder.

None of the prior art addresses the issue of feed segregation which often occurs in the path between the point in which the two feed materials are mixed, and the point right before the inlet of the extruder. Rubber crumbs and polyethylene particles have very different physical and rheological characteristics. They tend to segregate into either rubber-rich or polyethylene-rich populations before they enter the extruder. Such a feed segregation results in a porous pipe whose composition is nonuniform and different from the desired overall feed composition. As a consequence, the porosity as well as the strength of the porous pipe vary significantly along the length of the porous pipe made using these technologies.

Another issue that has been overlooked in the prior art processes is the varying degree of compaction exerted on the rubber crumbs before the feed enters the extruder. It is well known that rubber is a highly compactible material. Compaction can occur as a result of gravity head in the hopper or varying extruder pressure. Various degrees of gravity or different extruder pressures cause different degrees of compaction of the rubber crumbs and therefore result in varying concentrations of rubber crumbs in the feed. It has been disclosed in the prior art patents that the proportion of rubber crumbs significantly impacts the porosity of the final porous pipe product. Therefore, uncontrolled degree of compaction further causes uncontrolled porosity in the final product.

Due to the lack of control over the composition of the feed mixture in the extruder, truly automatic operation was not possible in any of the prior art processes. Automation of the manufacturing process generally requires the simultaneous adjustments of the post-extrusion tension applied on the final pipe, and the pressure and/or temperature inside the extruder barrel and at the diehead. A prerequisite of the automation process, however, is a controlled feed composition at a pre-determined value.

SUMMARY OF THE INVENTION

The main object of this invention is to provide a porous flexible pipe made of a thermoset material and a thermoplastic material whose composition is consistently and substantially equal to the feed composition to insure a controlled porosity.

Another object of the invention is to provide a porous flexible pipe of controlled pore size by introducing into a die extruder a blended mixture comprising a thermoset material such as rubber crumbs and a thermoplastic material such as polyethylene particles, wherein the same feed composition is maintained throughout the entire process by eliminating the possibility of feed segregation and compaction.

Yet another object of the present invention is to provide porous flexible pipes of varying but controlled porosity from the aforementioned process by varying the process variables such as the amounting of tension exert on the pipe after the extruder, and/or the temperature and pressure in the extruder.

Yet another object of the present invention is to provide porous flexible pipes of varying but controlled porosity from the aforementioned process which further includes a computer in cooperation with a plurality of control means to simultaneously adjust process parameters such as post-extrusion tension, and temperature and/or pressure inside the extruder barrel.

This invention relates to flexible porous pipes having controlled pore size. Flexible porous pipes can be made by extruding a mixture of thermoplastic material such as polyethylene and thermoset materials such as prevulcanized rubber crumbs through a die extruder. The mixture is heated in the extruder. While the thermoset material such as rubber crumbs are not materially affected by the heating process, the thermoplastic component of the mixture will either melt or soften sufficiently to form a binder matrix surrounding the thermoset particles. During the heating process, the gaseous components, including the water vapor vaporized from the moisture that was initially attached to the surface of the input particles, expand and form void spaces. The soft porous pipe extruded from the extruder is quickly cooled to retain the voidage contained therein. Such voidage provides porosity of the final product.

Throughout this invention disclosure, the terms "porosity", and "pore size" are given a broader meaning than their ordinary definition. Generally speaking, the term porosity or pore size means a flow ability index which is directly related to, or proportioned to, the so-called Darcy permeability utilized in the description of flow through porous media under a pressure gradient. Furthermore, since the porous pipes described in the present invention are made of flexible and expandable material, the porosity or pore size often is a function of pressure. For low porosity pipes, it may be required that the pressure differential between the interior and exterior of the pipe be greater than a certain "threshold" value before fluid can leak through the pipe wall. Therefore, the porous pipes described in the present invention can be non-porous under one set of flowing conditions and porous under another set of flow conditions. The porosity or pore size used in this disclosure can also be taken to mean the inverse of such threshold pressure.

The porosity and other physical characteristics, such as strength of the porous pipe, are determined by the composition of pipe material and the exterior dimensions such as pipe diameter, wall thickness, etc. Most of the thermoset materials are quite compactible. This is especially true if prevulcanized rubber crumbs are used in the making of the pipes. Also, the thermoplastic feed stock such as polyethylene particles and thermoset rubber crumbs have quite different physical characteristics. They tend to segregate and cause the composition in the extruder to deviate from the desired feed composition. Such compaction and feed segregation problems can cause a wide variation in the porosity and other properties of the porous flexible pipes.

In the present invention, the feed streams comprising the thermoplastic polyethylene particles and the thermoset rubber crumbs are thoroughly blended after they are fed into the manufacturing system. This is the first step to insure the uniformity of the feed composition. Furthermore, a segregation-free solid delivery process is provided between the blender and the extruder to prevent any feed segregation, thereby to further insure that the composition of the feed stream entering the extruder is the same as the original feed. Compaction of the feed material usually occurs in a hopper attached to and before the extruder. In the present invention, a level control means is installed in the hopper to insure that the feed in the hopper is maintained under a constant extent of compaction, or even free of compaction. This is also an important step to insure not only that the porous flexible pipes are made from a mixture of thermoset and thermoplastic materials of uniform composition, but that the composition is substantially the same as the designed value to provide controlled porosity.

One of the advantages of having an apparatus that is competent of providing porous flexible pipes having controlled porosity as described hereinabove is that it enables the automation of the manufacturing process to produce porous pipes of pre-calculated designed porosity and desired strength. The property, including porosity, of the porous pipes is affected by the feed composition, temperature and/or pressure in the extruder, and the post-extrusion tension. Adjustment of pipe property often requires simultaneous adjustments of more than one of such process parameters. Previously, such automation was not available due to the lack of control over the feed composition in the extruder. With the present invention, the manufacturing engineer knows exactly what the feed composition is inside the extruder. Therefore, the entire manufacturing process can preferably be automated or computer controlled. The manufacturing engineer can issue a simple command which would automatically change the required process parameters to produce porous pipes of desired porosity and strength.

DETAILED DESCRIPTION OF THE PREFERRED EMBODIMENT

Figure 1:
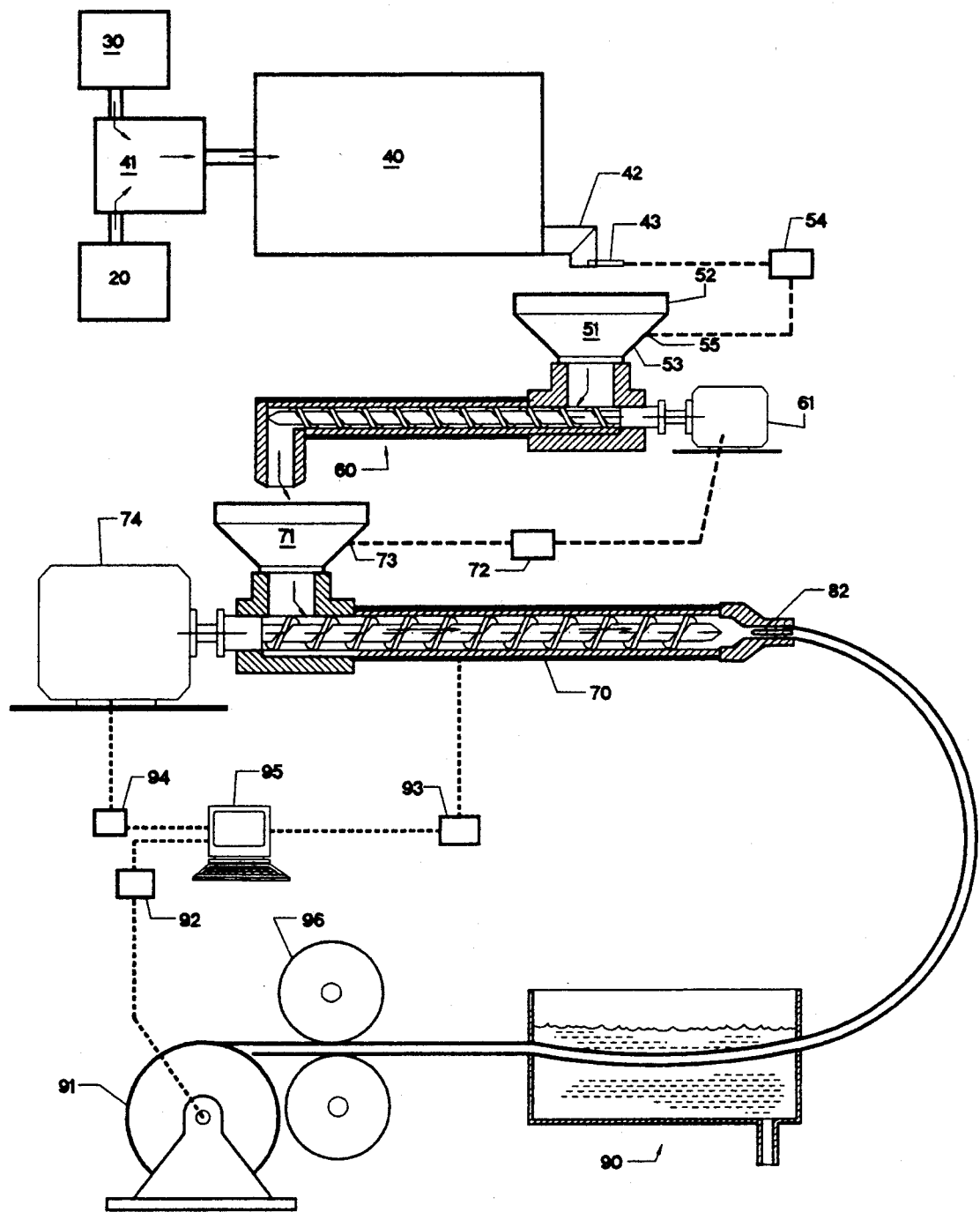
FIG. 1 shows a flow chart diagram of a preferred embodiment of the present invention.

Now referring to the drawing. FIG. 1, which is a schematic flow chart showing a preferred embodiment of the present invention, first shows two feed streams, one containing thermoplastic material such as polyethylene particles 20 and the other containing thermoset material such as prevulcanized rubber crumbs 30. It is preferred that a relatively unbranched low density polyethylene be used as the thermoplastic feed. Such a low density linear polyethylene has a crystallinity of about 50 percent. A true specific gravity between 0.90 and 0.95 is preferred. A true specific gravity between 0.91 and 0.93 is further preferred. Many other thermoplastic materials such as branched polyethylene, high density polyethylene, polypropylene, polyvinylchloride, poly (vinyl alcohol), etc., can be used. In this invention, recycled as well as virgin thermoplastic materials can be used as raw materials. One of the criteria for selecting a thermoplastic material is that it will soften or melt during a subsequent heating process to serve as a binder to bind the thermoset materials, which are fed in a form as particles. The thermoset feed 30, which is introduced as small particles, is basically a filler material. It should stand a high temperature and would not be materially affected during the subsequent heating process. A preferred thermoset feed material is prevulcanized rubber crumbs, which can be obtained from used tires and/or other recycled rubber products. Typically, the size of the thermoset material is maintained below 1/16th of an inch. It should be noted that the size of the rubber crumbs can greatly effect the porosity and the strength of the final product.

The two streams of feed materials are first introduced into a blender 40. This can be done with a batch process. The weigh scale 41 can be used to measure the amount of respective feed streams to be added to the blender 40. The blender 40 contains a blending device, such as a rake, to thoroughly mix the feed streams therein to form a homogeneously blended solid mixture. The blended mixture exits the blender through a slit 42 or any other suitable means and into a feed hopper 51. The slit may contain a gate means 43 to open and close the slit or to adjust the rate at which the blended mixture can exit the blender 40. Because the cross-sections of the feed hopper 51 are generally convergent from upstream (top) 52 to downstream (bottom) 53, the blended mixture will accumulate in the hopper 51 exerting various degrees of compactional force upon the mixture particles. Such a variation in the degree of compaction can cause the concentration of the mixture per unit of volume to change, which in turn can cause the variations in the porosity of the final product. Such a compaction variation also causes the composition of the final product to be different from the feed composition. To avoid such a compaction problem, a level controller 54 is placed in the hopper. The level controller comprises a level monitoring device 55, which can be a photo diode or an infrared level sensing device. When the level of the particles in the hopper reaches a certain level, the sensing device 55 will send a signal to a controller 54, which in turn will close or reduce the gate size 43 of the slit 42 to stop or reduce the rate of the blended mixture from the blender.

Feed mixture from the blender is then fed to a screw conveyor 60. The screw conveyor 60, which is driven by a motor 61, has small clearance to avoid any segregation of the two feed components during the feed transport process. The low clearance screw conveyor 60 transports the blended mixture into another hopper, an extruder hopper 71, which is mounted immediately before the extruder barrel 70. Again, a level controlling 72 means is placed in the extruder hopper 71 to maintain a constant level of the blended mixture therein. When the level of the blended mixture reaches a certain level in the extruder hopper 71, as detected by a sensing means 73, it will send a signal to stop or slow down the rate of the screw conveyor. This may, in turn, cause the level of the feed hopper 51 to rise and initiate a response involving the first level controller 54. The total control system can be cascaded to maintain uniformity over a range of operating inputs.

The blended mixture then exits the extruder hopper 71 and is fed into an extruder 70. The extruder 70 used here is a typical screw extruder driven by a motor 74 for wavy movement of blended mixture therein. The extruder 70 is provided with heating means to supply heat to the blended mixture. The temperature inside the extruder is maintained in such a manner so that the thermoplastic portion of the feed mixture will either melt or soften, while the thermoset component is relatively unaffected. An extruder 70 to be used to practice the invention typically is equipped with a drive motor 74, which drives the wave screw inside the extruder cylinder 70 through a gear drive chain not shown. The extruder 70 may also be provided with a cooling means to maintain a constant temperature environment. Further, the extruder 70 can be divided into separate temperature zones, each maintaining a separate temperature. The temperature in the extruder 70 is preferably maintained within a range between 250 to 350 degrees Fahrenheit, or preferably around 300 degrees Fahrenheit. The melted or softened thermoplastic material will form a coating around the thermoset particles. The thermoplastic material actually acts as a binder to bind the thermoset particles together in the final product. When the feed mixture is fed into the extruder 70, the feed particles contain a certain amount of moisture and some gaseous components. The moisture will vaporize and expand in volume due to the heating action in the extruder 70 and create void spaces in the melted or softened mixture. The softened or melted mixture containing such void spaces is forced through an extruder die head 82 to form a hollow pipe. The extruder die head 82 provides a constriction in the effective cross-sectional area of the extruder cylinder 70 and causes the pressure to build up within the extruder cylinder 70. A heating or cooling means, or combination thereof, may be provided in the extruder die head 82 for further temperature control.

The extruded pipe is cooled quickly in a cooling means 90 such as a water bath, to make the final product. In preferred embodiment the temperature in the cold water bath is maintained at about 60 degrees Fahrenheit. A post extrusion tension device 96 in conjunction with reel pipe coiler 91 driven by a set of gears is placed after the water bath to apply a controllable tension upon the final produced pipe to further insure a controlled constant porosity of the final porous pipe fabricate.

Because the present invention ensures that the feed composition in the extruder 70 is substantially the same as the feed composition in the initial input, the entire manufacturing process can be automated to make porous pipes of any desired porosity. In a preferred embodiment, separated controllers 92, 93, 94 are provided, respectively, for the reel pipe coiler 91 in conjunction with a post extrusion tension device 96 for controlling the tension exerted therefrom, and the extruder for controlling the temperature and pressure therein. Each of these controllers can be connected to a computer 95 via a digital/analog converter to receive command therefrom. A group of process parameters can be stored in the computer, each set corresponding to a specific porosity, or a certain combination of porosity/strength. For example, to produce "low porosity" pipes, the process parameters can be set at low tension, low temperature and high pressure. On the other hand, if "high porosity" pipes are desired, the process parameters can be set at high tension, high temperature and low pressure. A code can be assigned to each set of parameters. To produce a length of porous pipes of pre-determined quality, the operator simply enters a code or presses a button, the computer will issue a series of commands to adjust the proper tension, pressure and temperature to produce the desired product via the digital/analog converter and controller combinations. Such an automation is not possible with the prior processes due to the lack of control of the feed composition inside the extruder.

Whereas the present invention is illustrated with the best mode hereof, it should be realized that various changes may be made without departing from essential contributions to the art made by the teachings hereof.

What is claimed is:

1. An apparatus for making flexible porous pipe of controlled uniform porosity, said apparatus comprising:
   (a) first delivery means for transporting a thermoplastic material at a first predetermined rate;
   (b) second delivery means for transporting a thermoset material at a second predetermined rate;
   (c) a blender means for receiving said thermoplastic material and said thermoset material and blending said materials in a controlled, uniform manner and discharging a blended mixture therefrom, said blended mixture having a predetermined feed composition which is determined by said first predetermined rate and said second predetermined rate;
   (d) an extruder means having a receiving means at one end and a die head at the other end for making pipes of a predetermined dimension from said blended mixture of materials;
   (e) a delivery means for transporting said blended mixture from said blender means to said receiving means of said extruder means in a substantially compaction-free state during transportation by said delivery means, said delivery means comprising at least one low clearance screw conveyor and at least one feed hopper, said feed hopper containing a level controlling means to insure a constant gravity head therewithin, said feed hopper being positioned immediately after said conveyor means and before said receiving means in said extruder means;
   (f) temperature control means in said extruder means for melting or softening said thermoplastic material contained therein without substantially affecting said thermoset material; and
   (g) cooling means positioned after said extruder means to quickly cool said pipes whereby said porous pipes so formed having a composition substantially equal to feed composition to assure a controlled porosity of said porous pipes.

2. The apparatus of claim 1 wherein said level controlling means comprises a level sensing means which is adapted to monitor the level of said blended mixture therein and send a signal to control the speed of said conveyor belt and/or stop the movement thereof.

3. The apparatus of claim 2 wherein said level sensing means is a photo diode or an infrared level sensor.

4. The apparatus of claim 1 wherein said delivery means further comprises one additional feed hopper positioned immediately after said blender means and before said low clearance screw conveyor, said feed hopper containing a level controlling means to insure a constant gravity head there within.

5. The apparatus of claim 4 wherein said level controlling means of said additional feed hopper comprises a level sensing means which monitors the level of said blended mixture in said additional feed hopper therein and sends a signal to control the rate by which said blended mixture is discharged from said blender means and/or to stop the discharge of said blended mixture therefrom.

6. The apparatus of claim 5 wherein said level sensing means is a photo diode or an infrared level sensor.

* * * * *